(12) United States Patent
Rissmann

(10) Patent No.: US 12,170,461 B2
(45) Date of Patent: Dec. 17, 2024

(54) ROTOR FOR AN ELECTRIC MACHINE

(71) Applicant: Vitesco Technologies Germany GMBH, Regensburg (DE)

(72) Inventor: Ralf Rissmann, Berlin (DE)

(73) Assignee: Vitesco Technologies Germany GmbH, Regensburg (DE)

( * ) Notice: Subject to any disclaimer, the term of this patent is extended or adjusted under 35 U.S.C. 154(b) by 289 days.

(21) Appl. No.: 17/690,721

(22) Filed: Mar. 9, 2022

(65) Prior Publication Data

US 2022/0200378 A1 Jun. 23, 2022

Related U.S. Application Data

(63) Continuation of application No. PCT/EP2020/074335, filed on Sep. 1, 2020.

(30) Foreign Application Priority Data

Sep. 11, 2019 (DE) .......................... 102019213891.8

(51) Int. Cl.
*H02K 1/276* (2022.01)

(52) U.S. Cl.
CPC ......... *H02K 1/276* (2013.01); *H02K 2201/06* (2013.01)

(58) Field of Classification Search
CPC ... H02K 1/276; H02K 1/2766; H02K 2201/06
USPC ................................................. 310/216.011
See application file for complete search history.

(56) References Cited

U.S. PATENT DOCUMENTS

| | | | |
|---|---|---|---|
| 8,134,273 B2 | 3/2012 | Vollmer et al. | |
| 9,876,403 B2 | 1/2018 | Blum et al. | |
| 2005/0104461 A1 | 5/2005 | Hatz | |
| 2010/0052466 A1* | 3/2010 | Vollmer | H02K 1/278 |
| | | | 310/216.012 |
| 2010/0277027 A1* | 11/2010 | Kaiser | H02K 1/276 |
| | | | 310/156.47 |
| 2012/0049663 A1* | 3/2012 | Mishra | H02K 15/03 |
| | | | 29/598 |
| 2015/0015107 A1* | 1/2015 | Blum | H02K 1/276 |
| | | | 310/156.25 |
| 2019/0140501 A1 | 5/2019 | Leonardi et al. | |

FOREIGN PATENT DOCUMENTS

| | | |
|---|---|---|
| CN | 1663098 A | 8/2005 |
| CN | 106849426 A | 6/2017 |
| CN | 108696025 A | 10/2018 |

(Continued)

OTHER PUBLICATIONS

Mathoy (EP 2451049 A1) English Translation (Year: 2012).*

(Continued)

*Primary Examiner* — Tulsidas C Patel
*Assistant Examiner* — Robert E Mates

(57) ABSTRACT

A rotor for an electric machine, wherein the rotor has a plurality of annularly formed laminated core segments, which are arranged in succession in the longitudinal direction of the rotor, and each laminated core segment has at least one pocket with a pole component arranged therein, wherein the pole components arranged in succession in the longitudinal direction of the rotor form a pole assembly, and the pole assembly has a zigzag-shaped progression in relation to its longitudinal direction.

5 Claims, 3 Drawing Sheets

(56) References Cited

FOREIGN PATENT DOCUMENTS

| CN | 109617277 | A | | 4/2019 | | |
|---|---|---|---|---|---|---|
| CN | 209282958 | U | | 8/2019 | | |
| DE | 102006033718 | A1 | | 1/2008 | | |
| DE | 102012205191 | A1 | | 10/2013 | | |
| DE | 102016211600 | A1 | * | 12/2017 | | |
| EP | 2093863 | A1 | | 8/2009 | | |
| EP | 2451049 | A1 | * | 5/2012 | ............. | H02K 1/276 |
| JP | 2008131783 | A | | 6/2008 | | |
| WO | 2008062701 | A1 | | 5/2008 | | |

OTHER PUBLICATIONS

Bruc (DE 102016211600 A1) English Translation (Year: 2017).*
International Search Report and Written Opinion dated Nov. 16, 2020 from corresponding International Patent Application No. PCT/EP2020/074335.
German Office Action dated Mar. 23, 2020 for corresponding German Patent Application No. 102019213891.8.
Chinese Office Action dated Jan. 17, 2024 for corresponding Patent Application No. 202080064006.9.
Chinese Office Action datedJan. 15, 2024 for corresponding Patent Application No. 202080059059.1.

* cited by examiner

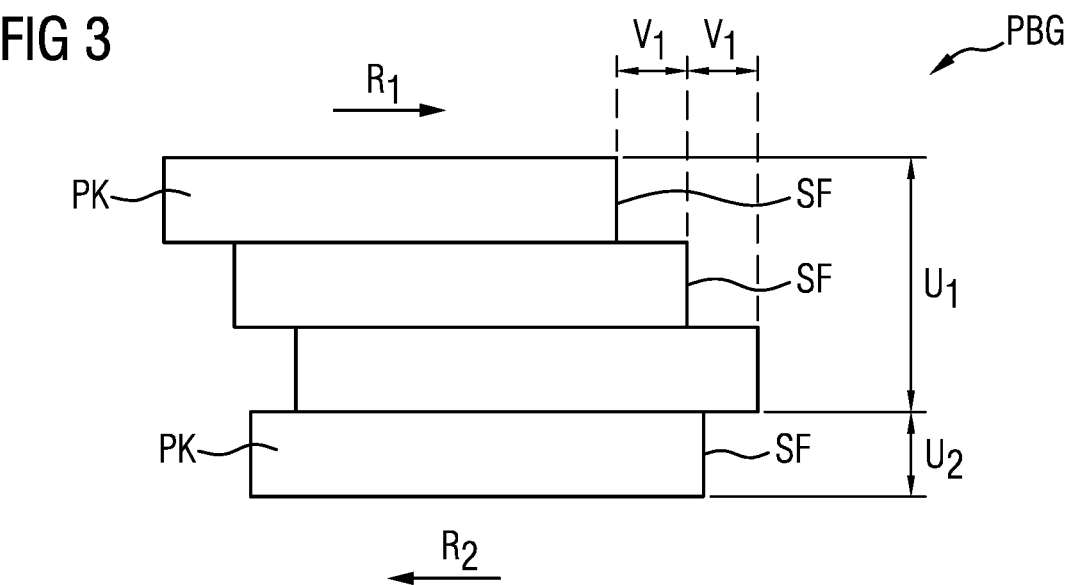
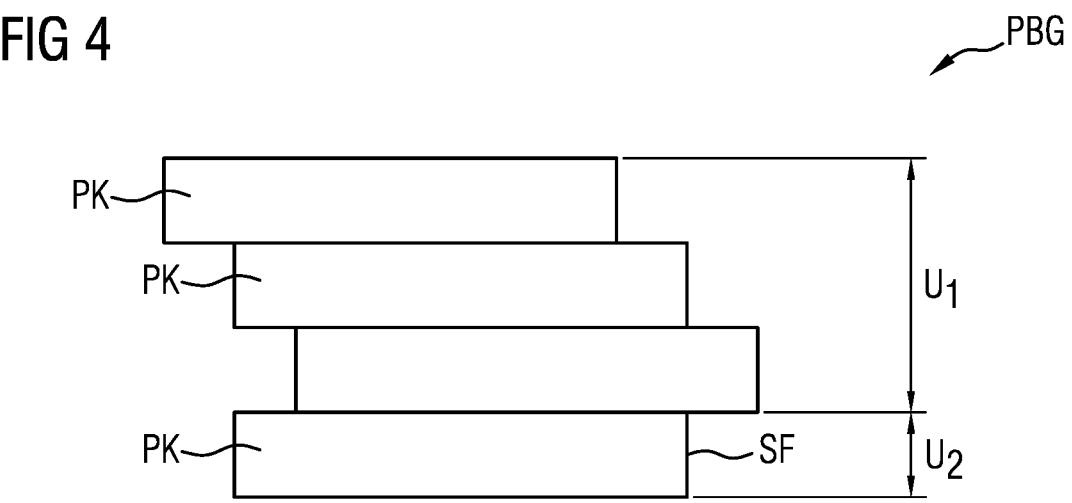

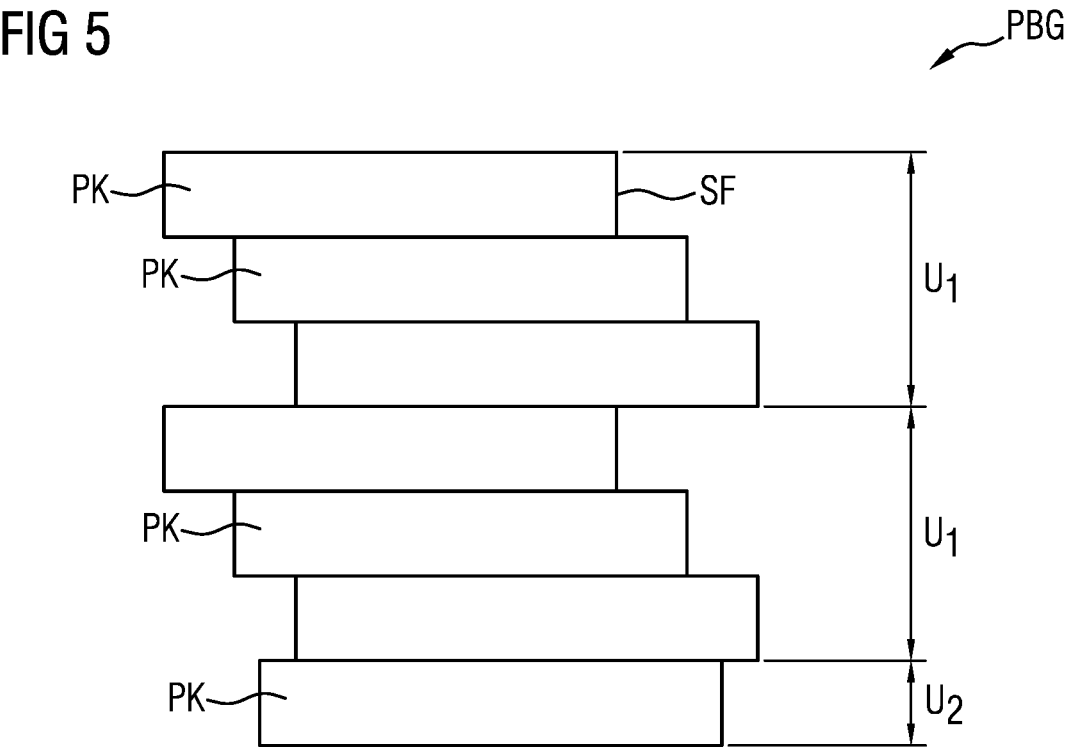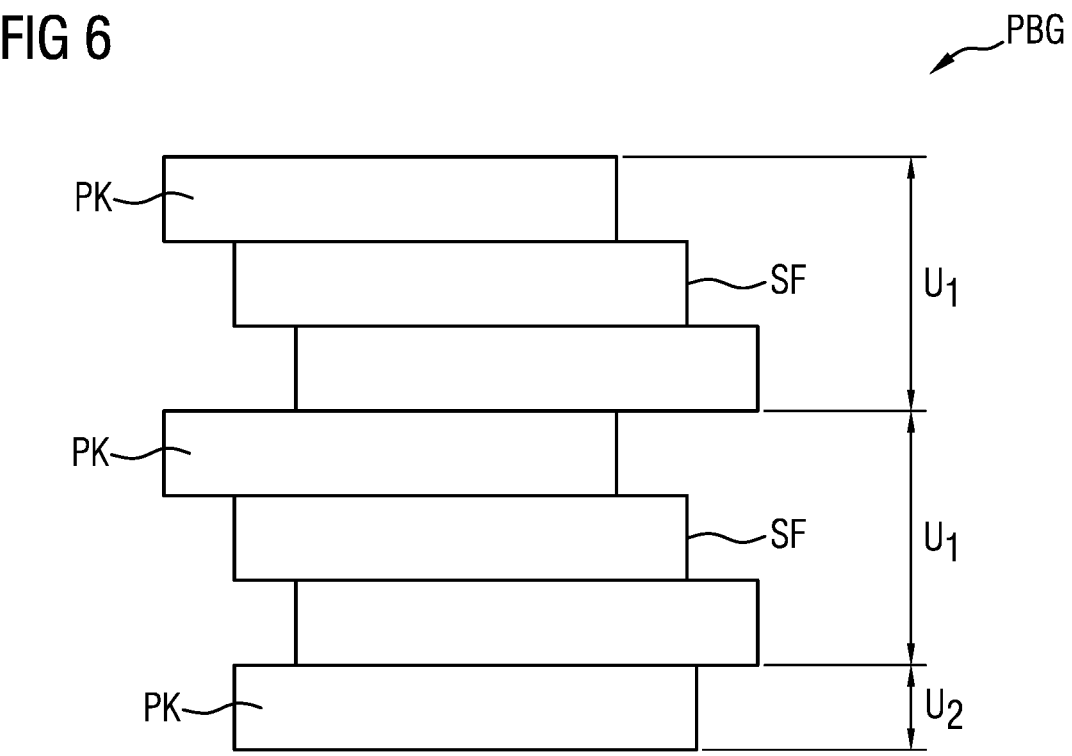

ROTOR FOR AN ELECTRIC MACHINE

CROSS-REFERENCE TO RELATED APPLICATIONS

This application claims priority to PCT Application PCT/EP2020/074335, filed Sep. 1, 2020, which claims priority to German Patent Application No. DE 10 2019 213 891.8, filed Sep. 11, 2019. The disclosures of the above applications are incorporated herein by reference.

FIELD OF THE INVENTION

The invention relates to a rotor for an electric machine, wherein the rotor includes at least one pole assembly including a plurality of pole components, and the pole components have a zigzag-shaped skew in relation to a longitudinal direction of the rotor. Moreover, the invention relates to an electric machine having the rotor according to the invention, and a motor vehicle having the electric machine according to the invention.

BACKGROUND OF THE INVENTION

Rotors for electric machines are essentially known. The known rotors generally have a plurality of laminated core segments arranged in succession in the longitudinal direction of the rotor. Receptacles and/or pockets for receiving pole components are formed within the laminated core segments. It is furthermore known that the laminated core segments are arranged with respect to one another in such a way that they are arranged and/or formed offset from one another in the circumferential direction, so that the pole components of a pole assembly have a linear skew in the circumferential direction of the rotor, for example. However, a linear skew is not optimal for every electric machine and can negatively influence the vibration and/or noise behavior of the electric machine.

SUMMARY OF THE INVENTION

The object of the invention is to specify a rotor for an electric machine, with which the vibration and/or noise generation of the electric machine is reduced.

This object is achieved by the subject matter described. Various developments of the invention are specified in the description and the Figures, wherein each feature may constitute an aspect of the invention both individually and in combination.

According to the invention, a rotor for an electric machine is provided, having a plurality of annularly formed laminated core segments, which are arranged in succession in the longitudinal direction of the rotor, wherein each laminated core segment has at least one pocket with a pole component arranged therein, which includes a side face parallel to the longitudinal direction of the rotor, wherein the pole components arranged in succession in the longitudinal direction of the rotor form a pole assembly, and the pole assembly has a first subassembly, and a second subassembly adjoining the first subassembly in the axial direction of the motor, the first subassembly includes at least three components, and the second subassembly has one pole component, the laminated core segments are arranged offset from one another in the circumferential direction in such a way that the pole components of the first subassembly are arranged offset from another in a first direction, wherein the side faces of the pole components of the first subassembly have an offset from one another so that all pole components of the first subassembly assume different offset positions, and the pole component of the second subassembly has an offset position, which lies between the offset positions of the pole components of the first subassembly which have greatest spacing and the smallest spacing from the pole component of the second subassembly in the axial direction of the rotor.

In other words, an aspect of the present invention is that a rotor for an electric machine is provided, which has a plurality of annularly formed laminated core segments, which are arranged in succession in the axial direction of the rotor. The respective laminated core segments generally have a plurality of lamination sheets, which are identical within a laminated core segment and are combined or connected to one another to form a laminated core segment.

Each laminated core segment has at least one pocket with a pole component arranged therein. Each laminated core generally has a plurality of pockets spaced from one another in the circumferential direction, wherein a pole component is arranged in each pocket. The pole components may also be referred to as a magnet or as a permanent magnet.

The pole component arranged in the respective laminated core segment has a side face in a direction parallel to the longitudinal direction of the rotor. Depending on the design or arrangement of the pocket in the respective laminated core segment, the side face is aligned in a tangential direction or in a circumferential direction of the laminated core segment. The pole components arranged in succession in the longitudinal direction of the rotor form a pole assembly. The pole assembly includes a first subassembly and a second subassembly adjoining the first subassembly in the axial direction of the motor. In this case, it is provided that the first subassembly includes at least three pole components. In other words, the first subassembly may have for example three, four, five, six, seven or more pole components. The second subassembly has only one pole component.

The pole components of the first subassembly are arranged offset from one another in a first direction in such a way that the side faces of the pole components of the first subassembly have an offset from one another, so that all pole components of the first subassembly assume different offset positions. It is thus provided that the pole components of the first subassembly are rotated with respect to one another in a first direction or first rotational direction of the laminated core segments, so that they have a linear skew in the first subassembly.

The pole component of the second subassembly has an offset position, which lies between the offset positions of the pole components of the first subassembly which have the greatest spacing and the smallest spacing from the pole component of the second subassembly in the axial direction of the rotor. In other words, the offset position of the pole component of the second subassembly lies between the respective offset position of the pole components which are arranged in the first subassembly and have the greatest spacing from the pole component of the second subassembly in the axial direction of the rotor and the smallest spacing from the pole component of the second subassembly in the axial direction of the rotor. A rotor for an electric machine is therefore provided, wherein the skew of the pole components of the pole assembly is formed in a zigzag shape.

The rotor is generally rotatably mounted and arranged spaced from a stator surrounding the rotor via an air gap. There is a time- and location-dependent force distribution in the radial, tangential and axial direction in this air gap. This force distribution is essentially influenced by the design of the rotor and may excite the stator and result in vibration and/or noise generation. A rotor with a zigzag-shaped skew of the laminated core segments or the pole components arranged therein may reduce the influences of the axial, radial and tangential forces acting in the stator, so that the noise vibration harshness behavior of the stator or the electric machine is positively influenced.

An embodiment of the invention consists in that all offset positions of the pole components within the pole assembly are different from one another. This indicates that the offset position of the pole component of the second subassembly is different from the offset positions of the pole components of the first subassembly, which are also all different from one another. However, it is not provided that the pole component of the second subassembly is continuously linearly skewed with respect to the pole components of the first subassembly, but rather that it is offset in a second direction which is contrary to the first direction.

Alternatively to this, an embodiment of the invention consists in that the offset position of the pole component of the second subassembly corresponds to an offset position of the pole component of the first subassembly, wherein the pole component of the first subassembly whereof the offset position is identical to the pole component of the second subassembly lies between the pole components of the first subassembly which have the greatest spacing and the smallest spacing from the pole component of the second subassembly in the axial direction of the rotor. It is thus provided that the offset position of the pole component of the second subassembly is not equal to the offset position of the first pole assembly which is the furthest removed from the pole component of the second subassembly, and is not equal to the offset position of the pole component of the first subassembly which is arranged closest to the pole component of the second subassembly.

In a development of the invention, it may essentially be provided that the offsets between the side faces of the pole components of the first subassembly are the same size. In this way, a skew of the pole components of the first subassembly is specified, wherein the offset angle between the successive pole components or lamination segments of the rotor of the first subassembly is the same.

An embodiment of the invention consists in that the offsets between the side faces of the pole components of the first subassembly are different from one another. In other words, it may be provided that a first offset between the side faces of two successive pole components of the first subassembly is greater than a second offset of two successive pole components of the first subassembly.

A further embodiment of the invention consists in that the rotor has a plurality of first subassemblies, which are arranged in succession in the axial direction of the rotor. In other words, it may be provided that the rotor has two successively arranged first subassemblies, wherein the offset positions of the respective pole components of the successive first subassemblies is identical.

Finally, an embodiment of the invention consists in that the rotor has a plurality of pole assemblies which are spaced from one another in the circumferential direction. In other words, the rotor may comprise two, three, four, five or more pole assemblies. In this case the pole assemblies are arranged spaced from one another in the circumferential direction.

The invention moreover relates to an electric machine having the rotor according to the invention.

The invention furthermore relates to a motor vehicle having the electric machine according to the invention.

Further features emerge from the following exemplary embodiments. The exemplary embodiments are not to be understood as restrictive, but rather as given by way of example. They are intended to enable a person skilled in the art to carry out the invention. The applicant reserves the right to make one or more of the features disclosed in the exemplary embodiments.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The exemplary embodiments are explained in more detail on the basis of Figures. In the drawings:

FIGS. 3 to 6 show different exemplary embodiments of an arrangement of pole components within the laminated core segments of a rotor.

DETAILED DESCRIPTION OF THE PREFERRED EMBODIMENTS

The following description of the preferred embodiment(s) is merely exemplary in nature and is in no way intended to limit the invention, its application, or uses.

Figure 1:
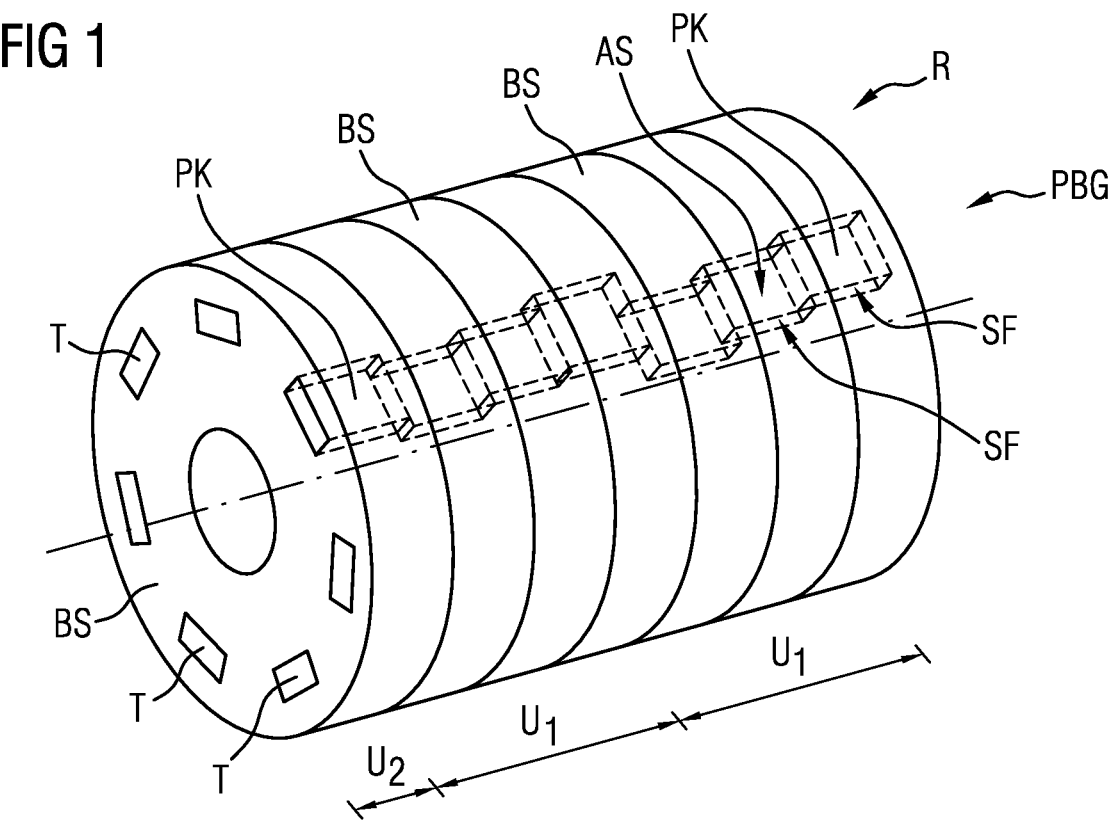
FIG. 1 shows a three-dimensional view of a rotor according to an exemplary embodiment of the invention.

A three-dimensional view of a rotor R for an electric machine is shown in FIG. 1. The rotor R has a plurality of annularly formed laminated core segments BS, which are arranged in succession in a longitudinal direction of the rotor R. Each laminated core segment BS has at least one pocket T with a pole component PK arranged therein. The pole component PK may also be referred to as a magnet, and in an embodiment, is a permanent magnet.

Figure 2:
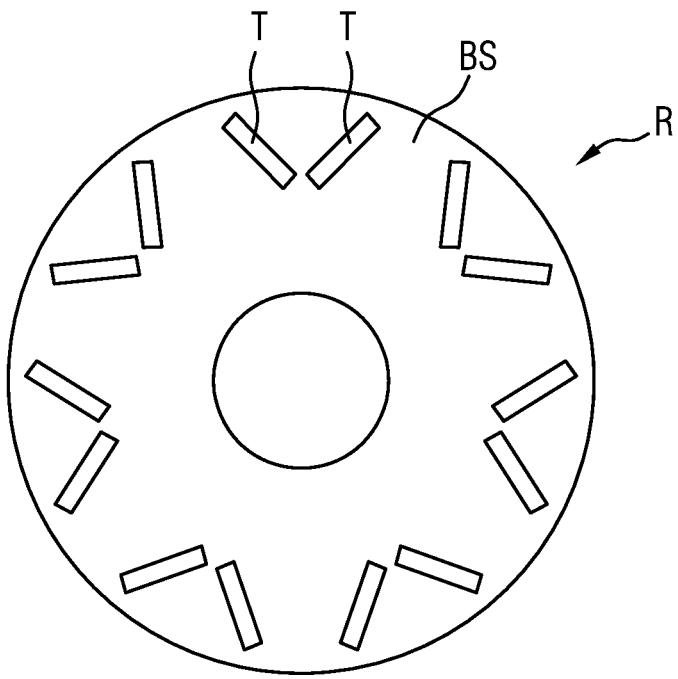
FIG. 2 shows a plan view of a laminated core segment of a rotor according to an exemplary embodiment of the invention.

In the present exemplary embodiment, the laminated core segments BS have a plurality of pockets T arranged spaced from one another in the circumferential direction, wherein the pockets T have a rectangular opening, which has a linear progression in the tangential direction of the laminated core segment BS. The pockets T may essentially also be formed and/or arranged in a V shape, as is shown by way of example in FIG. 2.

In relation to the exemplary embodiment shown in FIG. 1, the pole components PK have an outer side AS in the radial direction of the rotor R. The pole components PK have a side face SF parallel to the longitudinal direction of the rotor R. The pole components PK arranged in succession in the longitudinal direction of the rotor R form a pole assembly PBG.

The pole assembly PBG includes a plurality of first subassemblies $U_1$, which are arranged in succession in the axial direction of the rotor R. Each subassembly $U_1$ has at least three pole components PK. The second subassembly $U_2$, which is arranged adjoining the subassembly $U_1$ in the axial direction of the rotor R, has only one pole component PK. The pole components PK of the first subassembly $U_1$ and the second subassembly $U_2$ are arranged with respect to one another in such a way that the pole assembly PBG has a zigzag-shaped progression over its longitudinal extent or in the longitudinal direction of the rotor R. The influence of the axial, tangential and/or radial forces acting in the stator—during a rotation of the rotor R about its longitudinal axis—may be reduced via the zigzag-shaped progression so that the noise and/or vibration generation of the stator may be reduced.

FIGS. 3 to 6 show different configurations of an arrangement of pole components PK within the pole assembly PBG for a varying number of laminated core segments BS. FIGS. 3 to 6 are confined to merely illustrating the arrangement of the pole components PK. The rotor R and the laminated core segments BS are not illustrated in FIGS. 3 to 6.

A pole assembly PBG according to a first exemplary embodiment of the invention is shown in FIG. 3. The rotor R of this exemplary embodiment includes four laminated core segments BS arranged in succession in the longitudinal direction of the rotor. The pole assembly PBG thus includes four pole components PK arranged in succession in the longitudinal direction of the pole assembly PBG. In this case, the pole assembly PBG has a first subassembly $U_1$ and a second subassembly $U_2$ adjoining the first subassembly $U_1$. The pole components PK of the first subassembly $U_1$ are arranged offset from one another in a first direction $R_1$ in such a way that the side faces SF of the pole components PK of the first subassembly $U_1$ have an offset from one another, so that all pole components PK of the first subassembly $U_1$ assume different offset positions. The pole component PK of the second subassembly $U_2$ has an offset position, which lies between the offset positions of the pole components PK of the first subassembly $U_1$ which have the greatest spacing and the smallest spacing from the pole component PK of the second subassembly $U_2$ in the axial direction of the rotor R. In other words, the pole component PK of the second subassembly $U_2$ has an offset position, which lies between an offset position of the pole components PK of the first subassembly $U_1$ which have the greatest spacing from the pole component PK of the second subassembly $U_2$ in the axial direction of the rotor R on the one hand and the smallest spacing from the pole component PK of the second subassembly $U_2$ in the axial direction of the rotor R on the other.

It is furthermore provided that all offset positions of the pole components PK within the pole assembly PBG are different from one another. In other words, the offset position of the pole component PK of the second subassembly $U_2$ does not correspond to any offset position of the pole components PK of the first subassembly $U_1$.

A second exemplary embodiment of a pole assembly PBG is shown in FIG. 4. In contrast to the example shown in FIG. 3, the offset position of the pole component PK of the second subassembly $U_2$ is equal to an offset position of the pole component PK of the first subassembly $U_1$. In this case, it is provided that the pole component PK of the first subassembly $U_1$ whereof the offset position is identical to the pole components PK of the second subassembly $U_2$ lies between the pole components PK of the first subassembly $U_1$ which have the greatest spacing from the pole component PK of the second subassembly $U_2$ in the axial direction of the rotor R on the one hand and the smallest spacing from the pole component PK of the second subassembly $U_2$ in the axial direction of the rotor R on the other.

FIGS. 5 and 6 show a pole assembly PBG of a rotor R, which has seven laminated core segments BS.

In the exemplary embodiment shown in FIG. 5, the pole assembly PBG has two first subassemblies $U_1$ arranged in succession. The subassemblies $U_1$ are arranged in succession in the axial direction of the rotor. The subassembly $U_2$ is arranged adjoining a subassembly $U_1$. The two subassemblies $U_1$ are formed identically to one another. In other words, the respective subassemblies $U_1$ have the same offset positions. Within a first subassembly $U_1$, the pole components PK are, however, arranged offset from one another in such a way that the pole components PK have an offset Vi from one another. The pole components PK are arranged offset from one another in a first direction $R_1$. The pole components PK within a first subassembly thus have a linear progression.

The offset position of the pole component PK of the second subassembly $U_2$ does not correspond to any offset position of the pole components PK of the first subassembly $U_1$. All in all, the pole assembly PBG according to the third exemplary embodiment has a total of four different offset positions.

A pole assembly PBG according to a fourth exemplary embodiment is shown in FIG. 6, wherein, in contrast to FIG. 5, the offset position of the pole component PK of the second subassembly $U_2$ is identical to a pole component PK of the first subassembly $U_1$, as is also described and shown in FIG. 4. A zigzag-shaped progression of the pole assembly PBG in the axial direction is therefore shown, wherein the rotor R has a reduced number of laminated core sections since the number of offset positions of the pole components PK of a pole assembly PBG is reduced. A rotor R formed in this way reduces the noise vibration harshness behavior.

In the fourth exemplary embodiment, the offset Vi of the respective pole components PK of the first subassembly $U_1$ with respect to one another is 2.877° in each case. This indicates that the successive pole components PK within the first subassembly $U_1$ have an offset of 2.877° in each case. The offset positions of the pole components PK of the further first subassembly $U_1$ adjoining the first subassembly $U_1$ correspond to the offset positions of the subassembly $U_1$. These successive pole components PK of the further first subassembly $U_1$ therefore also have an offset of 2.877° in the first direction $R_1$. Starting with the maximum offset of the first subassembly $U_1$, i.e. a sum of the offsets Vi of the respective pole components PK of the first subassembly $U_1$, the pole component PK of the second subassembly $U_2$ is arranged offset through 2.877° in the second direction $R_2$, which is contrary to the first direction $R_1$.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotor for an electric machine, comprising:
   a plurality of annularly formed laminated core segments, which are arranged in succession in a longitudinal direction of the rotor;
   a plurality of pockets, at least one of the plurality of pockets formed as part of a corresponding one of the plurality of annularly formed laminated core segments;
   a plurality of pole components, each of the plurality of pole components disposed in a corresponding one of the plurality of pockets, each of the pole components having a side face parallel to the longitudinal direction of the rotor;
   a pole assembly formed by each of the plurality of pole components arranged in succession in the longitudinal direction of the rotor, the pole assembly further comprising:
   a plurality of first subassemblies, each of the plurality of first subassemblies further comprising:

at least three of the plurality of pole components arranged in succession in the longitudinal direction of the rotor, each of the plurality of first subassemblies being identical to one another;

a second subassembly having one of the plurality of pole components, the second subassembly adjoining one of the plurality of first subassemblies in the longitudinal direction of the rotor;

wherein the plurality of annularly formed laminated core segments are arranged offset from one another in a circumferential direction in such a way that the pole components of each of the plurality of first subassemblies are arranged offset from one another in a first direction;

wherein the side faces of the pole components of each of the plurality of first subassemblies have an offset from one another, so that all pole components of the plurality of first subassemblies assume different offset positions, such that the offsets between the side faces of the plurality of pole components of each of the plurality of first subassemblies are the same size, and the pole component of the second subassembly has an offset position, which lies between the offset position of two of the at least three of the plurality of pole components of each of the plurality of first subassemblies which have a greatest spacing and a smallest spacing from the pole component of the second subassembly in the longitudinal direction of the rotor.

2. The rotor of claim 1, wherein all offset positions of the plurality of pole components within the pole assembly are different from one another.

3. The rotor of claim 1, wherein the offset position of the pole component of the second subassembly corresponds to an offset position of one of the plurality of pole components of the plurality of first subassemblies, such that the offset position of the pole component of the second subassembly is between one of the plurality of pole components of the plurality of first subassemblies which has a greatest spacing from the pole component of the second subassembly in the longitudinal direction of the rotor and another of the plurality of pole components of the plurality of first subassemblies which has a smallest spacing from the pole component of the second subassembly in the axial longitudinal direction of the rotor.

4. The rotor of claim 1, wherein the rotor is part of an electric machine.

5. The rotor of claim 4, wherein the electric machine is part of a motor vehicle.

* * * * *